United States Patent [19]

Johnson

[11] Patent Number: 4,467,048

[45] Date of Patent: Aug. 21, 1984

[54] METAL OXIDE-NIOBIUM (V) HYDRIDE/OXIDE COMPOSITIONS AND PROCESS FOR PREPARING THEM

[75] Inventor: Thomas H. Johnson, Houston, Tex.

[73] Assignee: Shell Oil Company, Houston, Tex.

[21] Appl. No.: 527,897

[22] Filed: Aug. 30, 1983

[51] Int. Cl.³ .................... B01J 21/04; B01J 21/08; B01J 23/20

[52] U.S. Cl. .................................. 502/246; 502/60; 502/84; 502/353; 502/354

[58] Field of Search ................. 502/60, 84, 246, 353, 502/354

[56] References Cited

U.S. PATENT DOCUMENTS

| | | | |
|---|---|---|---|
| 3,220,959 | 11/1965 | Orzechowski | 502/224 |
| 3,285,890 | 11/1966 | Aftandilian | 502/224 |
| 3,852,184 | 12/1974 | Siskin et al. | 502/224 |
| 4,061,689 | 12/1977 | Ryu et al. | 585/462 |

*Primary Examiner*—W. J. Shine

[57] ABSTRACT

Compositions are disclosed which comprise a metal oxide substrate having niobium (V) hydride/oxide bound to the surface thereof.

12 Claims, No Drawings

METAL OXIDE-NIOBIUM (V) HYDRIDE/OXIDE COMPOSITIONS AND PROCESS FOR PREPARING THEM

FIELD OF THE INVENTION

This invention relates to novel metal oxide compositions having niobium (V) hydride bound to the surface thereof. These compositions are useful as catalysts.

SUMMARY OF THE INVENTION

This invention relates to novel metal oxide compositions. These compositions comprise a metal oxide substrate having niobium (V) hydride/oxide bound to the surface of the substrate. These compositions are useful as catalysts such as, for example, olefin isomerization catalysts. In general, they are prepared by reacting a substantially anhydrous oxide metal substrate having surface hydroxyl groups with a niobium pentahalide in the vapor state whereby a niobium (V) halide/oxide-metal oxide composition is prepared and subsequently reacting the niobium (V) halide/oxide-metal oxide composition with a hydrogen-containing reducing agent or atmosphere whereby the halide of the niobium (V) halide/oxide-metal oxide composition is liberated as hydrogen halide, thus producing the niobium (V) hydride/oxide-metal oxide composition of the instant invention. Preferred metal oxide substrates are aluminum oxide gels, silicon oxide gels and silicon-aluminum oxide-gels. The niobium (V) chloride/oxide-metal oxide composition is a preferred intermediate for making the instant compositions.

DESCRIPTION OF THE PREFERRED EMBODIMENTS

The compositions of the instant invention comprise pentavalent niobium (also written as niobium (V)), hydrogen (hydride), oxygen (oxide) and a solid metal oxide substrate wherein at least one valence of niobium is bound to oxygen, which oxygen is bound to the substrate, and the remaining valences of niobium are bound to hydrogen.

The metal oxides that are useful as substrates to prepare the compositions of the instant invention are those inorganic oxides which have hydroxyl groups attached to the surface of the substrate. The hydroxyl groups provide the means by which the niobium pentahalides are initially bound to the surface of the substrate. The scope of the invention is broad and any metal oxide having surface hydroxyl (or oxyhydroxyl) groups can be utilized.

The term "metal oxide" although used herein in the singular tense, is meant to include the single oxides such as silica, or alumina as well as plural and complex oxides such as silica-alumina, silica-alumina-thoria, zeolites and clays.

The preferred metal oxide substrates used to prepare the instant compositions are the porous, solid inorganic oxides which are conventionally used as catalysts and catalyst supports. Non-limiting examples of these types of materials include those having a major component of silica or alumina or both, such as, for example alumina and aluminous materials; silica and siliceous materials; clays, particularly open lattice clays; and crystalline aluminosilicates (zeolites). Non-limiting examples of aluminous and siliceous materials include, for example, silica-alumina, silica-magnesia, silica-zirconia, silica-titania, alumina-chromia, alumina-ferric oxide, alumina-titania as well as ternary compositions such as, for example, silica-alumina-thoria, silica-alumina-zirconia, etc. Non-limiting examples of crystalline alumino-silicates useful as substrates include synthetic zeolites such as, for example, A, X, Y, L and ZSM types such as ZSM-5 and others and naturally occurring zeolites, such as erionite, faujasite, mordenite, sodalite, cancrinite and others. Non-limiting examples of open lattice clays useful as substrates include bentonite, montmorillonite and others. In a preferred embodiment, the metal oxide should have a major component of silica or alumina or both.

Particularly suitable as substrates for preparing the instant compositions are those solid inorganic oxide composition known as metal oxide gels or gel oxides. The gel oxides which are particularly suitable for use in preparing the compositions of the instant inventions are any of the metal oxide gels that are well known in the catalytic art useful as either catalyst base metals or as promoting materials in catalyst compositions. Additionally, the term "metal oxide gel" or "gel oxide" as used herein shall also include the plural oxide gels, i.e., those that contain mixtures or compounds of two or more metal oxides. A metal oxide gel is basically a metal oxide that contains chemically bound water in the form of hydroxyl groups or oxyhydroxyl groups. Upon calcination at sufficiently elevated temperatures, water is given off and the gel is converted to the oxide with two hydroxyl moieties giving one molecule of water and an oxygen is attached to a metal ion. Illustrative of gel oxide substrate materials used to prepare the composition of this invention are aluminas, silicas, alumina-silicas, alumina-zirconias, silica-zirconias and the like, including naturally occurring hydrous oxide minerals such as clays, such as, for example, the kaolinites, the montmorillonites, and the like. Among the clays, the open lattice clays are particularly desirable. Also included are the zeolites, both natural and synthetic. The structure of the gel oxides can range from amorphous to highly crystalline. Preferred oxide gel materials are selected from the group consisting of alumina, silica, alumino-silica, crystalline aluminosilicates (zeolites) and open lattice clays.

Since the niobium (V) halide is bound to the surface of the metal oxide substrate by a reaction of the halide with the metal oxide substrate, the metal oxide must have pendant surface hydroxyl groups attached to the surface. Before reaction, the metal oxide substrate must have pendant surface hydroxyl groups, whereas, after reaction the metal oxide may or may not have surface hydroxyl groups, depending on the degree of reaction with the niobium pentahalide.

Prior to use in preparing the instant compositions, the hydroxyl-containing metal oxide substrate should be substantially free of absorbed water, i.e., "substantially dehydrated or anhydrous". The absorbed or free water is removed by heating the substrate at temperatures ranging from about 100° C. to about 900° C. prior to contact with the niobium pentahalide vapor. Any environment that provides for drying is suitable such as air, vacuum, inert gas such as nitrogen, etc. The dried substrate should be kept away from a humid atmosphere after drying. It is understood that a dried metal oxide substrate will still contain chemically bound water in the form of hydroxide and oxyhydroxide.

An aluminum oxide gel is one of the preferred substrates. This alumina can be any of the variety of available aluminas. These are commercially available under various names such as alumina gels, activated aluminas, gamma aluminas, etc. Regarding purity of the alumina, it may be stated that small amounts of impurities are not generally detrimental, and may be beneficial when the impurity is present as a co-gel. In fact "impurities may be purposely added for catalytic effects. The following table lists several commercial aluminas and their properties which are found suitable.

| Alumina | Surface Area, $m^2g$ | Pore Vol., cc/gm | Na, ppm | $SO_4^=$, % wt | $Fe_2O_3$ % wt | $Cl^-$, % wt |
| --- | --- | --- | --- | --- | --- | --- |
| CCI[a] | 252 | 0.8 | 160 | 0.06 | — | 0.02 |
| KA-201[b] | 365 | 0.42 | 600 | 0.03 | — | 0.01 |
| RA-1[c] | 263 | 0.26 | 4700 | 0.02 | 0.18 | — |
| ACCO[d] | 225 | 0.68 | 580 | 0.6 | — | 0.6 |
| Norton | 218 | 0.62 | 0.51 | 0.03 | — | 0.03 |

[a]Catalysts & Chemicals, Inc., now United Catalysts
[b]Kaiser
[c]Reynolds Corp.
[d]American Cyanamid Corp.
[e]Conoco Corp.
[f]Filtrol Corp.

Silica gel is also another preferred substrate. These are readily available commercially and are essentially substantially dehydrated amorphous silica. These materials are available in various density grades, from low density with surface areas ranging from about 100–300 $m^2/g$ to regular density with surface areas up to about 800 $m^2/g$. The commercially available materials are used as dessicants, selective absorbents, catalysts and catalyst supports. Regarding purity of the silica, it may be stated that small amounts of impurities are not generally detrimental and may be beneficial when the impurity is present as a co-gel. In fact, "impurities" may be purposely added for catalytic effects. The following table lists several commercial silicas and their properties which are found suitable.

| Support | Surface Area, $m^2/g$ | Pore Vol, cc/g | Density g/cc | Particle Size |
| --- | --- | --- | --- | --- |
| Davison* Grade 952 $SiO_2$ | 300 | 1.65 | 0.35 | 70 mesh (avg) |
| Davison Grade 59 $SiO_2$ | 300 | 1.15 | 0.38 | 8 mesh |
| Davison Grade 57 $SiO_2$ | 300 | 1.0 | 0.4 | 100 mesh |
| Davison Grade 12 $SiO_2$ | 700 | 0.54 | 0.75 | 20 mesh |
| Davison Grade 03 $SiO_2$ | 750 | 0.43 | 0.7 | 8 mesh (avg) |

*Manufactured by Davison Chemical Div., W. R. Grace & Co.

Other preferred substrates are the aluminosilicates. These materials contain various mixtures of aluminum and silicon oxides. They are readily available commercially and are generally employed as cracking catalysts. Typically they contain from about 50 to about 95, preferably from about 70 to about 90 percent by weight of silica. Illustrations of commercially available alumina-silicas are Davison Grade 980-25 (manufactured by Davison Chemical Division, W. R. Grace & Co.) which contains about 75% $SiO_2$ and 25% $Al_2O_3$ and Davison Grade 980-13 which contains about 87% $SiO_2$ and 13% $Al_2O_3$. These materials can be prepared in a conventional fashion, as for example by co-precipitation, co-gellation, or by spray drying.

Encompassed within the term "aluminosilicates" are most of the zeolites.

The zeolites are found to be specifically useful as substrates. Zeolites are ordered, porous crystalline aluminosilicates having a definite crystalline structure within which there are a large number of small cavities which are interconnected by a number of still smaller channels. Zeolites useful as substrates may be either synthetic or natural. At least 34 species of zeolite minerals are known and the synthetic zeolites number in the hundreds. Any zeolite will be useful as a substrate provided that the zeolite, prior to reaction with niobium pentahalide, contains chemically bound water in the form of hydroxyl groups. Depending on the state of reaction, the reacted product may contain no hydroxyl groups if all such groups were reacted with the tantalum pentahalide, or there may be unreacted hydroxyl groups still present.

The techniques for the preparation of the niobium pentahalide intermediates are well known in the art and typically are prepared by passing a dry halogen gas over niobium metal at elevated temperatures. By way of illustration, niobium pentachloride is prepared by passing dry chlorine over niobium metal sheet at a temperature of about 300° C. to 350° C. (Alexander & Fairbrother, *The Journal*, 1949, 5223). The niobium pentahalides utilized will comprise niobium pentafluoride, niobium pentachloride, niobium pentabromide and niobium pentaiodide.

The metal oxide-niobium (V) hydride/oxide compositions of the instant invention are prepared by a process comprising reacting under substantially anhydrous and oxygen-free conditions a suitable metal oxide substrate which has water chemically bound as hydroxyl and which is substantially free from absorbed water with niobium pentahalide vapor whereby a niobium (V) halide/oxide-metal oxide composition is prepared and subsequently reacting the niobium (V) halide/oxide-metal oxide composition with a hydrogen-containing reducing agent whereby the halide of the niobium (V) halide/oxide-metal oxide compositions is liberated as hydrogen halide, and thereby producing the composition of the instant invention.

Thus are produced metal oxide compositions having niobium (V) hydrides/oxides bound to the surface thereof. By the term "bound" it is meant that the pentavalent niobium has at least one valence bound to an oxygen which is part of the metal oxide substrate. By the term "surface" it is meant both the external and internal pore surfaces which are accessible to the niobium pentahalide vapor during the preparation process.

The niobium pentahalides readily sublime and thus lend themselves to a preferred method of preparation which is called "reactive sublimation" wherein niobium pentahalide is sublimed into an anhydrous, non-oxidizing atmosphere and allowed to contact and thus react with the metal oxide to form the intermediate niobium (V) halide/oxide-metal oxide composition.

In the preparation of the intermediate niobium (V) halide/oxide-metal oxide compositions, it is important that the reaction be carried out under substantially anhydrous conditions and in a neutral or reducing environment to prevent decomposition of the niobium halide.

In this preferred method of preparing the intermediate, the niobium (V) pentahalide is sublimed by suitable application of temperature and/or vacuum into an essentially anhydrous and oxygen-free atmosphere where it is allowed to contact and react with a substantially anhydrous, hydroxyl-containing metal oxide substrate. Any temperature and/vacuum which causes the niobium pentahalide to sublime is suitable. Temperatures up to about 200° C. are suitable. Sublimation conditions will vary somewhat depending on which niobium pentahalide is being utilized. Frequently the metal oxide substrate is heated during the reaction, say up to about 200° C. This heating is not critical, but it has been found that by so heating, a more even distribution of the niobium pentahalide on the metal oxide substrate is affected. After reaction, the metal oxide composition is frequently subjected to an additional period of time at sublimation conditions without the presence of a niobium pentahalide source. This extra step allows for any unreacted niobium pentahalide to be sublimed off the metal oxide composition. As noted above, the metal oxide substrate before use is frequently subjected to a heat treatment to remove absorbed water. Vacuum can also be applied. Generally, if this pretreatment temperature is too low, free water will remain, and, if the temperature is too high, sintering of the metal oxide substrate will occur, both of can adversely affect the properties of the composition. Generally, the most desireable pretreatment temperatures range from about 200° to about 400° C.

It is postulated that when niobium pentahalide reacts with the hydroxyl group of a metal oxide gel, that the reaction may be illustrated variously as follows (using chloride as an illustrative halide):

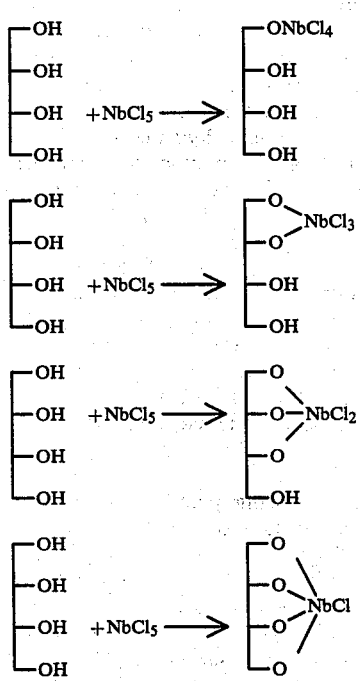

In the intermediate composition, a mixture of the above described reaction products will exist. The distribution of these reaction products is believed to be affected by reaction conditions, such as temperature.

Thus, depending on the niobium content desired in the final composition, a niobium pentahalide vapor is reacted with hydroxyl-containing metal oxide until a part of the whole of the hydroxyl group population of the metal oxide substrate is exhausted.

It will be apparent that products having varying niobium contents will be suited for various purposes. Thus, the niobium pentahalide intermediate may be reacted with the hydroxyl-containing metal oxide substrate in such amounts as is necessary to prepare final products which are suitable for the particular purposes.

The reaction between the niobium pentahalide vapor and the hydroxyl-containing metal oxide substrate is carried out at temperatures ranging from room temperature to elevated temperatures, say 150°–200° C. or higher. The reaction is normally carried out in an anhydrous, i.e., free from water vapor, atmosphere. The atmosphere should further be a neutral or reducing atmosphere, ie.e, oxygen-free. Dispersal of the niobium pentahalide vapor in a vacuum provides a quite suitable atmosphere for reaction with the metal oxide substrate.

A more detailed description of preparation of the niobium (V) halide/oxide-metal oxide intermediate composition is described in application Ser. No. 527,536 filed Aug. 29, 1983, incorporated by reference herein.

The final step in the preparation of the compositions of the instant invention comprises contacting the niobium (V) halide/oxide-metal oxide intermediate composition described above with a hydrogen-containing reducing agent.

A reducing agent may comprise a hydrogen-containing atmosphere. It may for example comprise pure hydrogen, or hydrogen diluted with a suitable inert gas such as nitrogen or argon. When a hydrogen containing gas is utilized, typically the niobium (V) halide/oxide-metal oxide composition intermediate will be contacted with the gas at a pressure of greater than 50 psi and the temperature of greater than 50° C. Pressures will typically range from about 50 to about 2000 psi, although the upper pressure range is not critical. The temperature will range from about 50° C. to about 200° C.

An alternate way of preparing the instant compositions is to contact the niobium (V) composition described above with a more traditional hydrogen containing reducing agent such as lithium hydride, sodium borohyde, sodium cyanoborohydride and the like. A preferred reducing agent comprises $MAl(H)_n(OR)_{4-n}$ where n ranges from 1 to 4, R is a substituted or unsubstituted alkyl or polyether alkyl group having a carbon number ranging from 1 to about 12 and M is an alkali metal.

When these conventional hydrogen-containing reducing agents are utilized it is necessary to dissolve or slurry them in an appropriate solvent. The solvent can be chosen from a wide variety of organic solvents such as hydrocarbon, e.g., petroleum ether, n-hexene, isooctane, and the like or aromatics solvents such as benzene, toluene and the like. Other solvents utilized are the ethers, especially the polydentate ethers and tetrahydroduran. Monoethers such diethyl ether, dibutyl ether, methyl-ethyl ether and the like are examples which can be utilized as solvents. Furthermore, diethers such as dimethylglycol diethylether, propylene-glycol dibutylether, hexeneglycol diamylether, and the like can be employed. Typical tridentate ethers suitable in the process of the invention are diethyleneglycol, dimethylether, ethyleneglycol, dibutylether and the like. Cyclic ethers such as ethylene oxide, tetrahydrofuran, dioxane, trioxane and 1,3,5,7-tetroxocane and the like may be employed. Higher polyethers and the thioether analogs of the compounds previously mentioned are also applicable.

A preferred reducing agent is $MAl(H)_n(OR)_{4-n}$ where $n=1$ to 4, R is a substituted or unsubstituted alkyl or polyether alkyl group having a carbon number ranging from 1 to about 12 and M is alkali metal. Preferably R is alkyl or polyether alkyl having a carbon number ranging from 2 to about 6. The illustrative examples are sodium bis(2-methoxy ethoxy) aluminum hydride, sodium tris(2-methoxy ethoxy) aluminum hydride, sodium bis(ethoxy) aluminum hydride and similar compounds. A readily available commercial reducing agent is the sodium bis(2-methoxy ethoxy) aluminum hydride which is known as VITRIDE® Reagent (manufactured by Hexcel) or RED-AL® Reagent (manufactured by Aldrich). The particular desirabilities of these reducing agents listed are their solubilities in organic solvents such as the hydrocarbons, the aromatic solvents and the ethers. Both the compound and its residue after reaction with the halide intermediate preferably should be soluble in suitable solvents. Thus, after reaction the residue can readily be removed from the composition of the instant invention by washing with the appropriate solvent. When utilizing these conventional reducing agents, a typical method of preparation is to slurry the niobium (V) halide/oxide-metal oxide intermediate compositions in a suitable solvent, add the reducing agent which is also dissolved in this suitable solvent to the slurry, mix these together, allow to react and separate by conventional means, i.e. filtration or centrifugation, the products of the instant invention from the solvent and spent reducing agent.

The niobium (V) hydride/oxide-metal oxide compositions of the instant invention may be produced in virtually any physical form, as for example, in the form of pellets, beads, extrudates, microspheres and in other particular forms, as for example rings, saddles and the like and in porous or non-porous form.

This invention thus comprises novel compositions and the methods for producing them. The compositions basically comprise metal oxide substrates having niobium (V) hydrides reactively bound to the surface of said substrate. The compositions are prepared by reducing a niobium (V) halide/oxide-metal oxide composition with a hydrogen-containing reducing agent. In a particularly preferred process the compositions are prepared by process which comprises contacting a hydroxyl-containing metal oxide substrate in a substantially anhydrous state with a niobium pentahalide in the vapor state and allowing the vapor to react with the substrate in an atmosphere which is substantially oxygen- and water-free, whereby a niobium (V) halide/oxide-metal oxide composition is prepared and subsequently reacting this niobium (V) halide/oxide-metal oxide composition with a hydrogen-containing reducing agent or atmosphere whereby the halide of the niobium (V) halide/oxide-metal oxide composition is replaced by hydrogen.

The compositions of the instant invention and an illustrative use of these compositions as a catalyst will be further described below by the following Illustrative Embodiments which are provided for illustration, and are not to be construed as limiting the invention.

ILLUSTRATIVE EMBODIMENTS

The following illustrates the preparation of a composition of the instant invention. In this preparative technique a glass scrubbing bottle was modified by internally adding a coarse fritted disc which divided the bottle into an upper section and lower section. The lower section was fitted with a stoppered connection which allowed it to be charged with niobium pentahalide and the upper section was fitted with a vacuum stopcock connection which allowed it either to be closed off or connected to a vacuum. To the modified gas-scrubbing bottle were added about 20 g of $NbCl_5$ to the bottom section and about 60 g of Davison 57 silica ($-20+30$ mesh, pretreated at 300° C. under 0.1 torr vacuum for 12-24 h) to the top section. Both sections were loaded in a dry box containing a nitrogen atmosphere. The bottom section was stoppered and the top section had the vacuum stopcock closed before removing from the dry box. The bottom section of the bottle was immersed into an oil bath and heated at about 150° C. The top section was wrapped with heating tape and heated to about 150° C. A vacuum (about 0.1 torr) was applied at the top of the bottle. The heating and vacuum phase of the preparation was simultaneous and carried out over a period of 18 h. At the end of 18 h, the bottle (vacuum stopcock closed) was put back into the dry box and 20 g a fresh $NbCl_5$ was added to the bottom section. The rest of the procedure was then repeated from another 18 h. Then, the silica was removed, in a nitrogen-filled dry box, and vertically sublimed at 150° C. and 0.1 torr for 18 h. This step was employed to remove any deposited but unreacted $NbCl_5$ on the silica surface. A small ($<200$ mg) of $NbCl_5$ was generally collected on the cold finger of the sublimator. The resulting material can be used as a catalyst without further preparation. The material contained on the average about 2-4 wt% Nb with a atomic ratio of chlorine to niobium of about 2.5 to 3.5:1.

Two grams of niobium (V) chloride-silica gel material prepared as described above was slurried in 75 ml of dry, deoxygenated benzene in a stirred flask. To this stirred flask was then slowly added 11.55 g of RED-AL® Reagent which is a 3.4 m solution of sodium bis(2-methoxyethoxy) aluminum hydride in toluene. This mixture was stirred for overnight at room temperature. The composition was filtered under vacuum and washed with 30 ml of benzene and the vacuum dried. The composition of the instant invention as prepared as above contained approximately 4 %w of niobium.

The following examples illustrate the use of the instant compositions in a catalytic reaction.

Five milliliters of 1-pentane in 5 ml of n-pentane and 1 g of the instant composition prepared above were added to a stirred reactor. After 72 hrs at 150° C. approximately 15% of the 1-pentene had been isomerized to 2-pentene.

I claim:

1. A composition comprising pentavalent niobium, hydrogen, oxygen and a metal oxide substrate wherein at least one valence of the niobium is bound to an oxygen which is bound to the substrate and the remaining valences of niobium are bound to hydrogen.

2. The composition of claim 1 wherein the metal oxide substrate is silica, alumina, silica-alumina, zeolite, open lattice clay or a mixture thereof.

3. The composition of claim 1 wherein the metal oxide substrate has a major component of silica or alumina or a mixture thereof.

4. The composition of claim 1 wherein the metal oxide substrate is a silicon oxide gel, an alumina gel or a silicon-alumina gel.

5. The compositions of claims 1, 2, 3 or 4 prepared by reacting a substantially anhydrous metal oxide substrate containing surface hydroxyl groups with a niobium pentahalide in the vapor state whereby a niobium (V) halide/oxide-metal oxide composition is prepared and subsequently reacting the niobium (V) halide/oxide-metal oxide composition with a hydrogen-containing reducing agent whereby the halide of the niobium (V) halide/oxide-metal oxide composition is replaced by hydrogen.

6. The compositions of claims 1, 2, 3 or 4 prepared by a process which comprises subliming a niobium pentahalide and reacting in a substantially anhydrous and oxygen-free atmosphere the vapor therefrom with a substantially anhydrous metal oxide substrate containing surface hydroxyl groups whereby a niobium (V) halide/oxide-metal oxide composition is prepared and subsequently reacting the niobium (V) halide/oxide-metal oxide composition with a hydrogen-containing reducing agent whereby the halide of the niobium (V) halide/oxide-metal oxide composition is replaced by hydrogen.

7. A process for preparing a metal oxide composition containing niobium (V) hydride/oxide bound to the surface thereof which process comprises subliming a niobium pentahalide and reacting in a substantially anhydrous and oxygen-free atmosphere the vapor therefrom with a substantially anhydrous metal oxide substrate containing surface hydroxyl groups whereby a niobium (V) halide/oxide-metal composition is prepared and subsequently reacting the niobium (V) halide/oxide-metal oxide composition with a hydrogen-containing reducing agent whereby the halide of the niobium (V) halide/oxide-metal oxide composition is replaced by hydrogen.

8. The process of claim 7 herein the metal oxide substrate is a silicon oxide gel an aluminum oxide gel or a silicon-aluminum oxide gel.

9. The process of claim 7 wherein the metal oxide substrate is silica, alumina, silica-alumina, zeolite, open lattice clay or a mixture thereof.

10. The process of claim 7 wherein the metal oxide substrate has a major component of silica or alumina or a mixture thereof.

11. The process of claim 7 wherein the hydrogen-containing reducing agent is a hydrogen-containing gas and the reaction with the hydrogen-containing gas is carried out at a temperature of greater than 50° C.

12. The process of claim 7 wherein the hydrogen-containing reducing agent is $MAl(H)_n(OP)_{4-n}$ where n equals 1 to 4, R is a substituted or unsubstituted alkyl or polyether alkyl group having a carbon number ranging from 1 to about 12 and M is an alkal metal.

* * * * *